United States Patent
Kushwaha et al.

(10) Patent No.: US 8,010,100 B2
(45) Date of Patent: Aug. 30, 2011

(54) SYSTEM AND METHOD FOR MONITORING AND MEASURING END-TO-END PERFORMANCE USING WIRELESS DEVICES

(75) Inventors: Rakesh Kushwaha, Marlboro, NJ (US); Badri Nath, Edison, NJ (US)

(73) Assignee: MFormation Technologies, Inc., Edison, NJ (US)

( * ) Notice: Subject to any disclaimer, the term of this patent is extended or adjusted under 35 U.S.C. 154(b) by 496 days.

(21) Appl. No.: 11/374,986

(22) Filed: Mar. 15, 2006

(65) Prior Publication Data

US 2006/0234639 A1   Oct. 19, 2006

Related U.S. Application Data

(60) Provisional application No. 60/661,506, filed on Mar. 15, 2005.

(51) Int. Cl.
*H04M 11/00* (2006.01)
*H04W 24/00* (2006.01)
*G06F 9/44* (2006.01)

(52) U.S. Cl. .......................... 455/423; 455/409; 717/166
(58) Field of Classification Search .................. 455/419, 455/67.11, 67.14, 423, 574; 713/181; 717/168
See application file for complete search history.

(56) References Cited

U.S. PATENT DOCUMENTS

| | | | |
|---|---|---|---|
| 7,006,820 B1 * | 2/2006 | Parker et al. ................... | 455/419 |
| 2001/0029178 A1 * | 10/2001 | Criss et al. ..................... | 455/419 |
| 2002/0069037 A1 | 6/2002 | Hendrickson | |
| 2003/0066064 A1 | 4/2003 | Rajaram | |
| 2005/0039178 A1 * | 2/2005 | Marolia et al. ................. | 717/168 |
| 2005/0059354 A1 * | 3/2005 | Zhao et al. ..................... | 455/67.11 |
| 2005/0091501 A1 * | 4/2005 | Osthoff et al. ................. | 713/181 |

FOREIGN PATENT DOCUMENTS

WO     9843455     10/1998

OTHER PUBLICATIONS

International Search Report and Written Opinion of the International Searching Authority dated Sep. 12, 2008 issued in the corresponding International Application No. PCT/US06/09290.
Extended European Search report dated Jun. 26, 2009, received in corresponding EP Patent application 06738362.0-1237/1859552 PCT/US2006009290.
Response, filed Jun. 15, 2010, to European Office Action based on grounds of rejection in Extended European Search report dated Jun. 26, 2009, received in corresponding EP Patent application 067393620-1237/1859552 PCT/US2006009290.

* cited by examiner

*Primary Examiner* — Kiet Doan
(74) *Attorney, Agent, or Firm* — Murphy & King, P.C.

(57) ABSTRACT

A system and method by which a mobile wireless device dynamically decides the other end host to initiate a session to automatically conduct a performance test. Results of the performance test are then transferred to a monitoring server under appropriate conditions. A method for conducting a performance test on a wireless device comprises receiving information indicating how and when a performance test is to be conducted by the wireless device, determining whether the conditions for the performance test to be started are met, conducting the specified performance test, and storing results of the performance test.

22 Claims, 5 Drawing Sheets

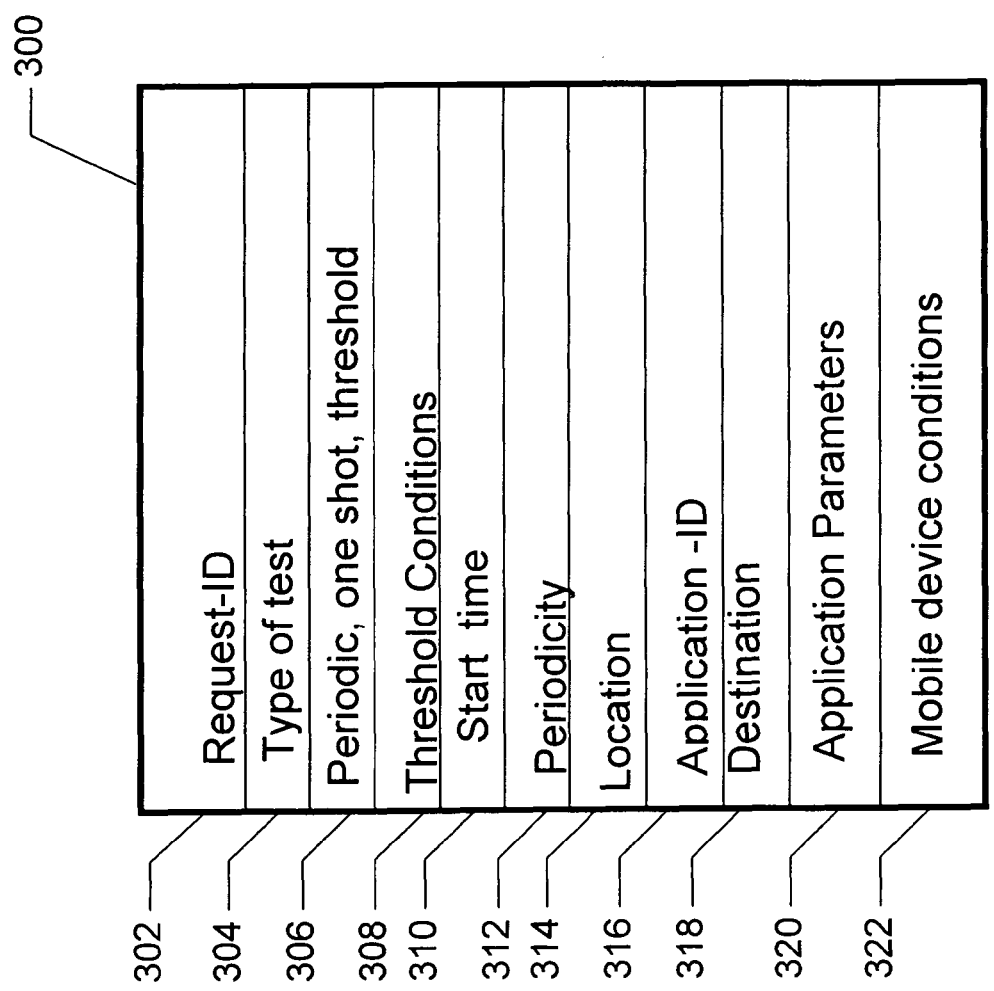

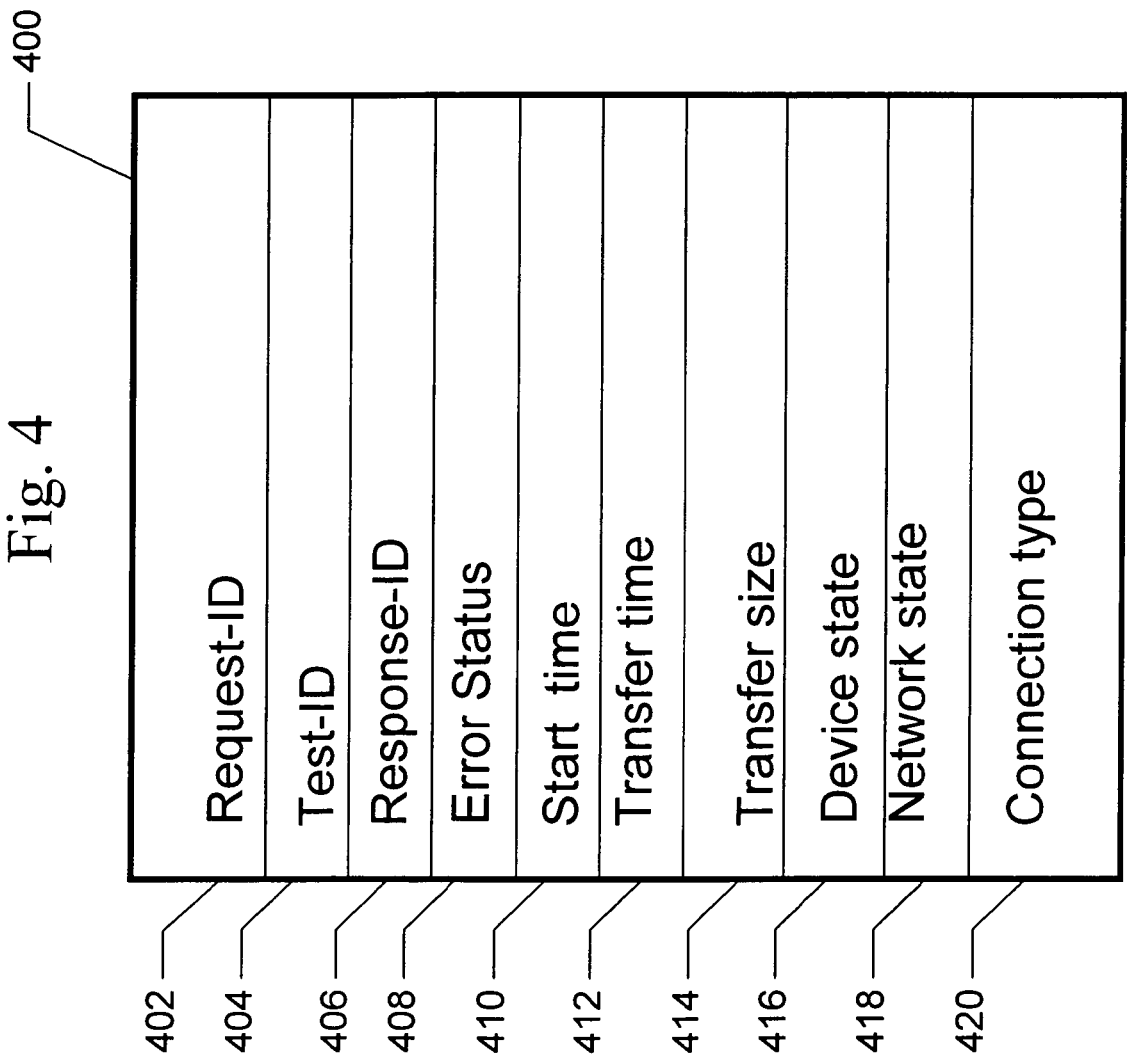

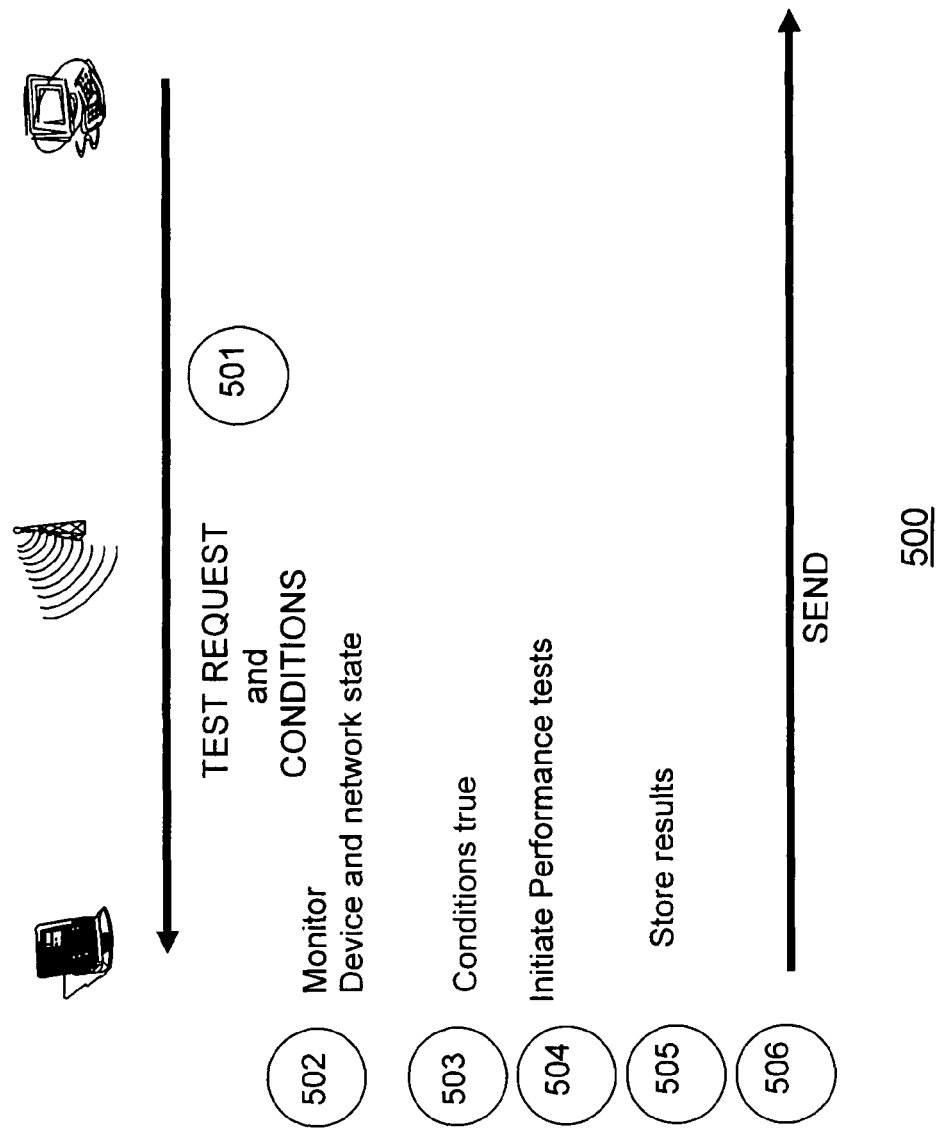

SYSTEM AND METHOD FOR MONITORING AND MEASURING END-TO-END PERFORMANCE USING WIRELESS DEVICES

CROSS-REFERENCE TO RELATED APPLICATIONS

This application claims the benefit of Provisional Application No. 60/661,506, filed Mar. 15, 2005.

FIELD OF THE INVENTION

The present invention relates to a system and method for monitoring the performance of applications on wireless networks, and more particularly, to initiating performance test, monitoring performance and collecting performance data for applications running on mobile wireless devices so as to determine the user experience.

BACKGROUND OF THE INVENTION

Existing performance tools for wired and wireless networks measure performance between two end points for a given duration or session. The end-hosts are designated specifically for the purpose of measurement. For example, to measure throughput, a file of given size is transferred and the amount of time taken to complete the transfer is measured to derive the throughput. Other metrics of interest include delay, packet loss, coverage, jitter etc. Further, due to the nature of wireless connectivity, the device may be out of coverage during the performance session resulting in loss of performance data. This may lead to repeating the experiment resulting in waste of precious wireless resources such as mobile device battery and wireless bandwidth.

Typically, performance tests are conducted between two end hosts which are selected a priori. This is not adequate in mobile networks as performance of the network needs to be determined at various locations and connectivity and coverage varies with location. Devices have to be placed at explicit locations to collect performance data. This is an expensive proposition and does not scale. Thus, the performance endpoints need to be dynamically determined based on location and specific network conditions by using existing user devices already connected to the network.

Another important consideration in mobile networks is when and how to send the results of performance data. Since, mobile device has to initiate, measure and collect performance data, the data has to be collected and stored and then transferred to a server when the network conditions are conducive for such a transfer. Since storage is a premium on mobile devices, a mechanism is needed to store the performance data in a small, fixed amount of storage and then communicate when the network conditions are right. In many cases, only the most recent performance data can be sent.

Thus, there is a need to conduct performance tests that dynamically determines the end hosts and more efficiently stores the performance data and sends the results of performance data on-demand, or at periodic intervals or based on a threshold condition using different transport protocols.

SUMMARY OF THE INVENTION

A system and method by which a mobile wireless device dynamically decides the other end host to initiate a session to automatically conduct a performance test. Results of the performance test are then transferred to a monitoring server under appropriate conditions.

One aspect of the invention is a method by which the service manager informs the mobile device about the tests to be conducted, the conditions under which the test should be started (time, location, network condition) and when the results should be transmitted. Based on the size of the results generated by conducting performance tests, appropriate means of transport from a set is chosen.

Another aspect of the invention is the methodology of conducting the actual test from the device to a specific end host. Once the request is received, the method involves monitoring the device conditions and network conditions to determine the appropriate moment to start the test. Certain tests have to be performed when the device is in certain state. For example, battery level or available memory on the device may be the condition to start the test. In other cases, it can be network conditions such as type of coverage or if the device is roaming. Further, the conditions under which the test is conducted can be any combinations of device state and network state. Based on the conditions the appropriate tests are initiated and test data collected by the mobile device.

Another aspect of the invention is determining the appropriate parameters to use in the performance test. The parameters depend on the particular application and the type of the test. Once the application whose performance is needed is chosen, the type of test will determine the parameters. For real-time applications, the length of the session, the location of the content server is used to generate a synthetic transaction and the performance data is collected. Based on the network type, the appropriate destination naming (number or IP address) is chosen. For non real-time applications, the location or address of the end host is determined and a connection initiated to download specific payload. The status of the test as well as the location when it was initiated is recorded. The type of the test will determine additional parameters that will be needed to perform the test. A latency test will involve initiating a connection, and measuring the round trip time, where as throughput test will involve the size of the data to be used in the transfer.

Yet another aspect of the invention is a method to efficiently store the results of the performance on the device and send it to the performance manager. Since, a mobile device is resource constrained, a fixed amount of storage has to be allocated for performance related data. The method involves using a fixed buffer and storing the results in a compact form to accommodate the results of a maximum number of tests as possible. The method further includes a means to store only the most recent results if the allocated storage is exhausted before the test results can be transferred to the service manager.

BRIEF DESCRIPTION OF THE DRAWINGS

The drawing shown here in, along with the description, illustrates the invention.

FIG. 3 is a test request record that shows the details of the test type and parameters sent to the device.

FIG. 4 is a result state record that shows the details of the results obtained after conducting the specified tests.

FIG. 5 is a test request response flow diagram that illustrates an aspect of the invention.

DETAILED DESCRIPTION

Figure 1:
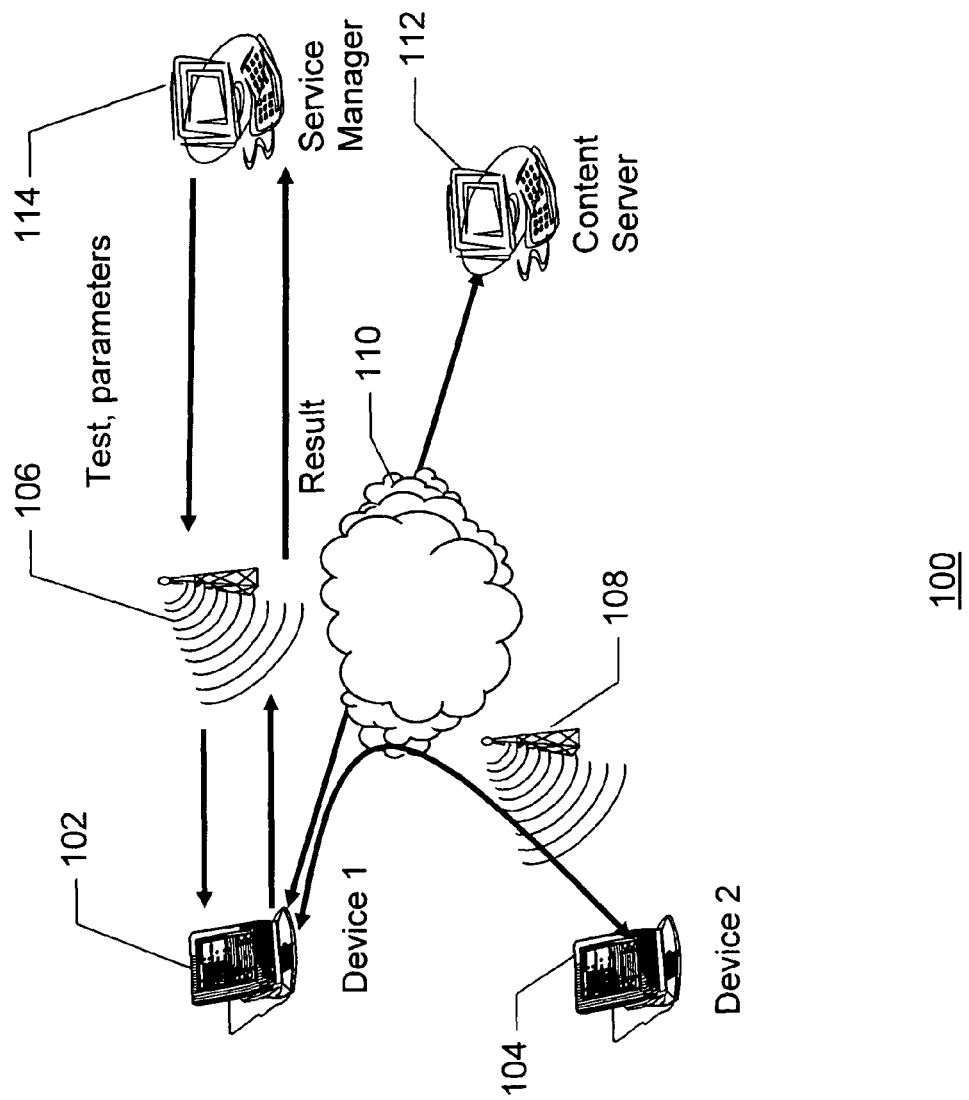
FIG. 1 is a diagram showing the architecture in which concepts underlying the described invention may be implemented.

An example of an architecture 100 in which concepts underlying the described invention may be implemented is shown in FIG. 1. In architecture 100, a plurality of wireless devices, such as device 1 102 and device 2 104, are communicatively connected via wireless infrastructure 106 and 108 and telecommunications network 110 to a content server 112 and to a service manager 114. For example, device 1 102 and device 2 104 may communicate with each other via wireless infrastructure 108 and telecommunications network 110. Likewise, device 1 102 may communicate with content server 112 and telecommunications network 110. In addition, device 1 102 may communicate with service manager 114 via wireless infrastructure 106.

Device 1 102 and device 2 104 may be any type of wireless device, such as a wireless telephone, personal digital assistant (PDA), mobile email device, etc. Likewise, content server 112 may be any type of server system that is capable of serving content upon request. Service manager 114 is typically a server system that is used by manage the services provided by and to wireless (and other) devices, but may be any type of computer system capable of performing the necessary functions.

It is to be noted that architecture 100 and the particular devices and communications arrangements shown in FIG. 1 are merely examples. The present invention contemplates any and all architectures and communications arrangements.

In one embodiment, the present invention includes a monitoring server sending commands to a wireless device, such as device 1 102, to initiate connection from the wireless device to a specified content server, such as content server 112, as well as from a wireless device, such as device 1 102, to another wireless device, such as device 2 104. In the example shown in FIG. 1, the monitoring server functionality is shown combined with service manager 114. However, this is merely an example. The present invention contemplates the monitoring server functionality being combined with service manager 114, the monitoring server functionality being implemented separately from service manager 114, the monitoring server functionality being partially combined with service manager 114 and partially separate from service manager 114, or any other combination or arrangement of functionality.

Figure 2:
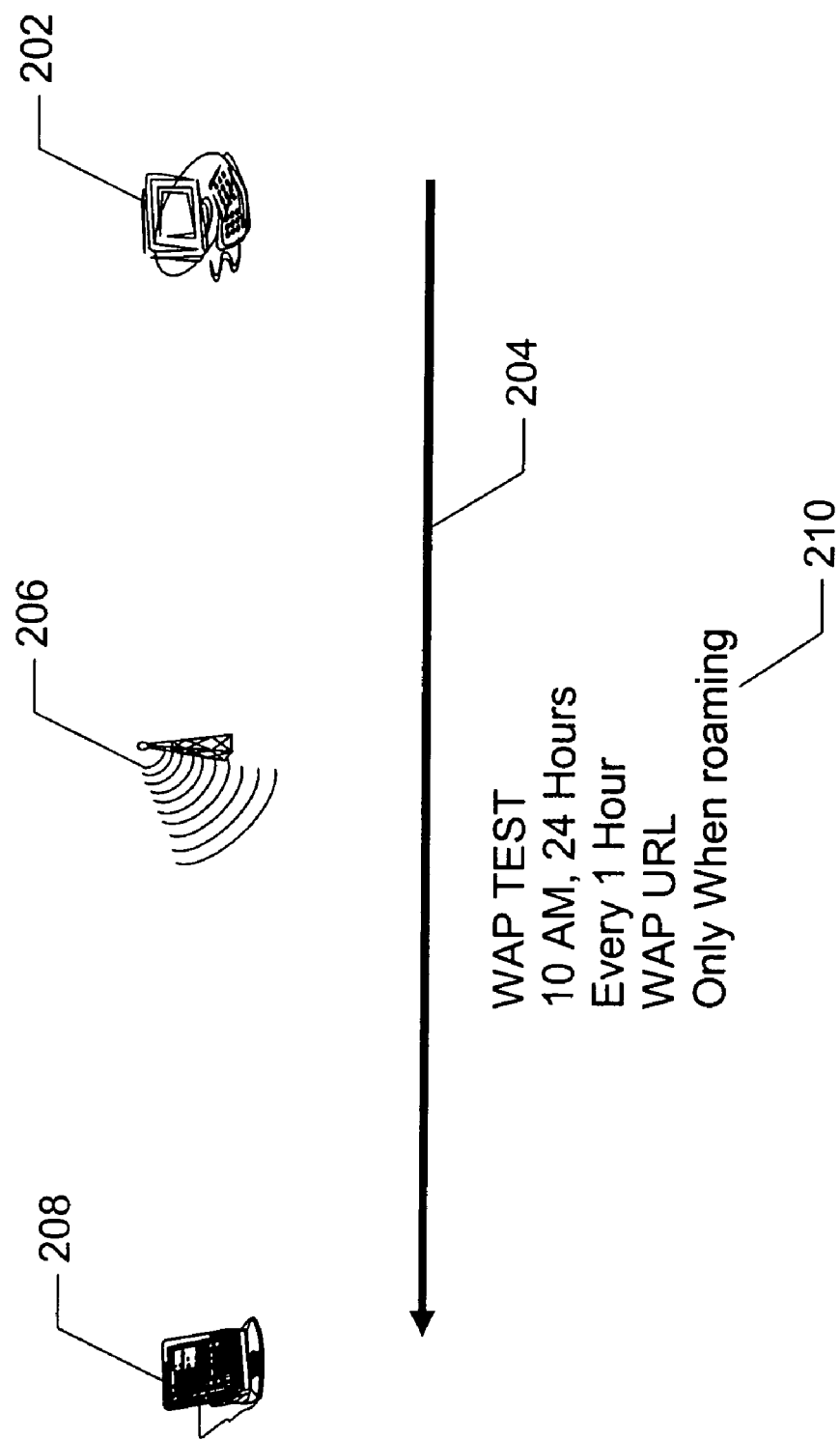
FIG. 2 is a diagram showing the test request sent by the service manager to the device.

An example of test measurement is shown in FIG. 2. In this example, monitoring server 202 transmits commands 204 via wireless infrastructure 206 to wireless device 208. The various measurement options are sent as command parameters 210. An example of command parameters 300 is shown in FIG. 3. Such parameters include an identifier 302 of the test request, an indicator 304 of the type of test to be performed, an indicator 306 of whether the test is to be performed periodically, one time only, or based on a threshold condition, an indicator 308 of any threshold conditions, an indicator 310 of a start time of the test, an indicator 312 of the period at which the test is to be periodically performed (if applicable), an indicator 314 of a location of the test, an identifier 316 of an application to be used to perform the test, an indicator 318 of a destination of the test, parameters 320 to be used by the application to be used to perform the test, and other conditions 322 relating to the mobile device. These parameters are merely examples of possible parameters; the present invention contemplates these and any other parameters that may be used.

The measurement procedure involves monitoring the performance of connections and sessions explicitly initiated for purposes of measurement. The data collected includes performance parameters such as system availability, latency, throughput, spatial and temporal correlation of lost packets. The performance test may initiated by the server by sending performance parameters to the device, and device can explicitly monitor connection performance, session performance or application performance and send back the results to monitoring server. An example of a test response 400 is shown in FIG. 4. Response 400 include information such as an identifier 402 of the test request, an identifier 404 of the test that was performed, an identifier 406 of the response to the test, an indicator 408 of any error status resulting from the test, an indicator 410 of a start time of the test, an indicator 412 of the transfer time for data transferred during the test, an indicator 414 of a size of the data transferred during the test, an indicator 416 of a state of the device that was tested, an indicator 418 of a state of the network that was used for the test, and an indicator 420 of a type of connection used for the test. This information is merely an example of possible information that may included in the response; the present invention contemplates this and any other information that may be used.

The performance conduit may be either device to server, such as between device 1 102 and content server 112, shown in FIG. 1, or device to device, such as between device 1 102 and device 2 104, shown in FIG. 1.

The performance test may be initiated on-demand (by request from the server), periodically at specified intervals, or based on a threshold condition. The threshold condition can be a combination of device state and network state.

An example of a process 500 to monitor and measure connection, session and application performance from the wireless terminal is shown in FIG. 5. It is best viewed in conjunction with FIGS. 3 and 4. Process 500 begins with step 501, in which the device to be tested is sent a start command for performance monitoring with parameters such as those shown in FIG. 3. For example, the parameters may include when the test should start 310, how often to repeat monitoring 312, when to report back results, the return transport (SMS or HTTP) for sending the test results, and the type of test 304, such as whether the test is device to device or device to server measurement.

In addition to the above, depending on the type of application, additional parameters may be sent as detailed below:

For Multimedia Messaging Service (MMS) tests, additional parameters such as a destination number 318, a message size to generate, and a status of the test (sent/failed/success) may be used. Upon success of the test, the device may report back both the transfer start time, and the received/current time in GMT back to the server (with the difference being the duration). In addition, the current location in the from of the cell ID, the lai, and the GPS coordinates of the wireless device may be sent.

For Wireless Access Protocol (WAP) tests, additional parameters such as a destination URL 318, connect and download pages at the URL, and a status of the test (success/failed) may be used. If successful, then additional data may include a connect time and download time, (where the sum of both times equals the total time of test), the start time 410 in GMT of the test and the end time GMT of the test, the cell ID, the lai, GPS coordinates of the wireless device, and the data size downloaded 414.

For HyperText Transfer Protocol (HTTP) tests, additional parameters such as a destination URL 318, connect and download pages at the url, and a status of the test (success/failed) may be used. If successful, then additional data may include a connect time and download time, (where the sum of both times equals the total time of test), the start time 410 in GMT of the test and the end time GMT of the test, the cell ID, the lai, the GPS coordinates of the wireless device, and the data size downloaded 414.

For VOICE tests, additional parameters such as a destination number, how long to hold the call, and a status of test (success/failed/busy) may be used. Additional data may include a start/end time in GMT, the cell ID, the lai, and the GPS coordinates of the wireless device.

For VIDEO tests, additional parameters such as a destination number, a length of the clip (size), and a status of test (success/failed/busy) may be used. Additional data may include a start/end time in GMT, the cell ID, the lai, and the GPS coordinates of the wireless device.

In step 502, the device monitors its state and the state of the network over which the test is to be conducted. The device and network states are compared to the conditions that were established for the test to start, as communicated by parameters in the test request. The performance test component on the mobile device automatically conducts tests when the specified conditions are met. The conditions can be combinations of device and network state. In step 503, the device determines that the conditions are true, and, in response, in step 504, the device initiates the performance tests. Upon completion of the performance tests, the device stores the test results, and in step 506, the device transmits the test results to the destination device for the test results. The collected results can be transferred to a service manager only when it is appropriate to do so. The local store and transfer of results will result in efficient use of limited resources on the mobile device.

This invention will provide the wireless application providers with vital information about the quality of service (QOS) for various applications provided to wireless users, different wireless networks, technologies, and independent operators.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for conducting a performance test on a wireless device comprising:
receiving information at the wireless device including information indicating at least one condition for determining how and when a performance test is to be conducted by the wireless device, wherein the condition comprises a state of the wireless device including at least one of a device capability, a state of a battery of the wireless device, a state of a memory of the wireless device, and a processing power of the device;
determining at the wireless device whether the at least one condition for the performance test to be started are met;
conducting the specified performance test at the wireless device; and
storing results of the performance test at the wireless device;
wherein the wireless device accepts the performance request only after verifying a digest sent by the service manager and transmits an acknowledgement to the service manager after the performance test is conducted, and
where in the digest for verifying the credentials of the service manager is generated by means of a shared private key stored in the wireless device and the service manager.

2. The method of claim 1, wherein the received information includes information indicating a type of application to be used to conduct the performance test and the performance test to be conducted is determined by the type of the application.

3. The method of claim 2, wherein the application type comprises a voice application, a data application, a video application, a multimedia application, or a group application.

4. The method of claim 1, wherein the information indicating at least one condition for determining how and when a performance test is to be conducted by the wireless device further comprises information indicating that the test is to be conducted periodically, or information indicating that the test is to be conducted at a specific time.

5. The method of claim 4, wherein it is determined whether the conditions for the performance test to be started are met by monitoring the state of the wireless device, the state of the network or both.

6. The method of claim 4, wherein the condition includes a location of the wireless device or a location of an other end-host.

7. The method of claim 6, wherein the end-host can be a fixed host or another wireless device.

8. The method of claim 6, wherein the location comprises a cell ID, a network ID, or Global Positioning System coordinates.

9. The method of claim 1, wherein the condition includes a combination of the state of the wireless device and a state of the network.

10. The method of claim 9, wherein the network state comprises at least one of a coverage area of the network, a type of coverage of the network, and a roaming status of the wireless device.

11. The method of claim 1, wherein the specified performance test is conducted and the results of the performance test are stored when the wireless device is not in communication with a server from which the information indicating at least one condition for determining how and when a performance test is to be conducted by the wireless device was received.

12. A method for conducting a performance test on a wireless device comprising:
receiving information at the wireless device including information indicating at least one condition for determining how and when a performance test is to be conducted by the wireless device, wherein the condition comprises a state of the network including at least one of a coverage are of the network, a type of coverage of the network, and a roaming status of the wireless device;
determining at the wireless device whether the at least one condition for the performance test to be started are met;
conducting the specified performance test at the wireless device; and
storing results of the performance test at the wireless device,
wherein the wireless device accepts the performance request only after verifying a digest sent by the service manager and transmits an acknowledgement to the service manager the performance test is conducted, and
wherein the digest for verifying the credentials of the service manager is generated by means of a shared private key stored in the wireless device and the service manager.

13. The method of claim 12, wherein the received information includes information indicating a type of application to be used to conduct the performance test and the performance test to be conducted is determined by the type of the application.

14. The method of claim 13, wherein the application type comprises a voice application, a data application, a video application, a multimedia application, or a group application.

15. The method of claim 12, wherein the information indicating at least one condition for determining how and when a performance test is to be conducted by the wireless device further comprises information indicating that the test is to be conducted periodically, or information indicating that the test is to be conducted at a specific time.

16. The method of claim 15, wherein it is determined whether the conditions for the performance test to be started are met by monitoring the state of the wireless device, the state of the network or both.

17. The method of claim 15, wherein the condition includes a location of the wireless device or a location of an other end-host.

18. The method of claim 17, wherein the end-host can be a fixed host or another wireless device.

19. The method of claim 18, wherein the location comprises a cell ID, a network ID, or Global Positioning System coordinates.

20. A method for conducting a performance test on a wireless device comprising:
    receiving information at the wireless device including information indicating at least one condition for determining how and when a performance test is to be conducted by the wireless device, wherein the received information includes information indicating an application to be used to conduct the performance test and the performance test comprises testing performance of an application on the wireless device;
    determining at the wireless device whether the at least one condition for the performance test to be started are met;
    conducting the specified performance test at the wireless device; and
    storing results of the performance test at the wireless device;
    wherein the wireless device accepts the performance request only after verifying a digest sent by the service manager and transmits an acknowledgement to the service manager after the performance test is conducted, and
    wherein the digest for verifying the credentials of the service manager is generated by means of a shared private key stored in the wireless device and the service manager.

21. The method of claim 19, wherein the application is a real-time application, a non real-time application, a voice application, a data application, a video application, a multimedia application, or a group application.

22. The method of claim 20, wherein the condition comprises a network state including at least one of a coverage area of the network, a type of coverage of the network, and a roaming status of the wireless device.

* * * * *

UNITED STATES PATENT AND TRADEMARK OFFICE
CERTIFICATE OF CORRECTION

PATENT NO. : 8,010,100 B2
APPLICATION NO. : 11/374986
DATED : August 30, 2011
INVENTOR(S) : Rakesh Kushwaha and Badri Nath It is certified that error appears in the above-identified patent and that said Letters Patent is hereby corrected as shown below:

In the Specifications at col. 5, line 63, delete "accents" and insert --accepts--.

Signed and Sealed this
Twenty-eighth Day of May, 2013

Teresa Stanek Rea
*Acting Director of the United States Patent and Trademark Office*